United States Patent Office 3,590,060
Patented June 29, 1971

3,590,060
FLUOROALKYLTIN COMPOUNDS
Robert M. Murch, Ashton, Md., assignor to Dow
Corning Corporation, Midland, Mich.
No Drawing. Filed Sept. 22, 1969, Ser. No. 860,028
Int. Cl. C07f 7/22; C08f 45/56; A01n 9/00
U.S. Cl. 260—429.7       5 Claims

ABSTRACT OF THE DISCLOSURE

Monomeric tin compounds, containing at least one 3,3,3-trifluoropropyl substituent are disclosed. These compounds find utility as stabilizers for polyvinyl resins, catalysts, pesticides, bactericides and oil repellants.

---

This invention relates to fluoroalkyltin compounds. More particularly, the invention relates to monomeric tin compounds which contain at least one 3,3,3-trifluoropropyl substituent.

It has been recently disclosed that fluoroalkyltin compounds having only hydrogen or alkyl radicals in the alpha and beta positions to the tin are extremely stable and can be used as release agents and oil repellents for paper and textiles—see U.S. Pat. 3,423,443. It it an object of the present invention to provide novel fluoroalkyltin compounds.

The compounds of the invention are monomeric tin compounds characterized by the formula $$(CF_3CH_2CH_2)_a Sn(R)_b X_{4-a-b}$$

in which
R is selected from the group consisting of the hydrogen atom, lower alkyl radicals, alkoxy radicals, acyloxy radicals, the vinyl group or a phenyl radical;
X is a halogen atom;
$a$ is an integer having a value of from 1 to 4 inclusive;
$b$ is an integer having a value of from 0 to 3 inclusive, the sum of $a+b$ being no more than 4.

As described above, R can be a lower alkyl radical, for example methyl, ethyl, butyl or amyl; and alkoxy radical, for example methoxy, ethoxy, butoxy and the like; or acyloxy radicals, for example, acetate, propinate and laurate. X includes as halogen atoms; chlorine, fluorine, bromine and iodine.

Thus, the compounds of the invention include 3,3,3-trifluoropropylmethyl tin dichloride;
3,3,3-trifluoropropyl tin trichloride;
bis(3,3,3-trifluoropropyl) tin dichloride;
tetrakis(3,3,3-trifluoropropyl) tin;
bis(3,3,3-trifluoropropyl)dibutyltin;
bis(3,3,3-trifluoropropyl)phenylmethyltin;
bis(3,3,3-trifluoropropyl) tin dibromide;
bis(3,3,3-trifluoropropyl) tin diacetate;
tris(3,3,3-trifluoropropyl)ethoxytin;
tris(3,3,3-trifluoropropyl)vinyltin;
3,3,3(trifluoropropyl)butyldimethoxytin;
bis(3,3,3-trifluoropropyl) tin dilaurate;
tris(3,3,3-trifluoropropyl) tin fluoride;
tris(3,3,3-trifluoropropyl)hydroxytin;
3,3,3(trifluoropropyl)butyltin dibromide;
bis(3,3,3-trifluoropropyl) tin di-iodide;
and tris(3,3,3-trifluoropropyl) tin iodide.

These fluoroalkyltin compounds may be produced by the well-known Grignard reaction as illustrated by the following equations:

$$4CF_3CH_2CH_2Br + SnCl_4 \rightarrow (CF_3CH_2CH_2)_4Sn$$

$$2CF_3CH_2CH_2MgBr + CH_3SnCl_2 \rightarrow$$
$$(CF_3CH_2CH_2)_2Sn(CH_3)_2$$

$$CH_3MgI + CF_3CH_2CH_2SnCl_3 \rightarrow CF_3CH_2CH_2Sn(CH_3)_3$$

Additional methods of production of fluoroalkyltin compounds are discussed in U.S. Pat. 3,423,443.

The trifluoropropyl tin compounds of the invention have a variety of utilities. Of principal interest is the use of the compounds as oil repellent treating agents for textiles, paper and wood. The fluoroalkyltin halides can be reacted with sodium methoxide to obtain the alkoxy-substituted tin compounds which when dissolved in a solvent, such as trichloroethylene, is especially suitable for impregnating cloth and leather. The treated substrates are rendered oil repellent and can easily be cleaned. Certain of the compounds such as $(CF_3CH_2CH_2)_3SnH$ are bactericides and exhibit this property with respect to both gram positive and gram negative bacteria. The tetrakis compound is toxic to the extent that it can be used as a pesticide. The acyloxy-substituted compounds have catalytic properties, especially in the curing or cross-linking organopolysiloxanes while the alkyl-substituted tin compounds are stabilizers for polyvinyl chloride materials. The compounds are also catalysts for the preparation of polyurethane foam materials by the reaction of a polyether, an organic isocyanate and water.

The following examples are illustrative, but not limiting, of the invention, which is properly delineated in the claims.

EXAMPLE 1

A Grignard reagent was prepared from 150 grams of magnesium metal and 885 grams of 3,3,3-trifluoropropylbromide in one liter of ether. Anhydrous stannic chloride (261 grams) was added to the $CF_3CH_2CH_2MgBr$ over a period of 2 hours. It was necessary to cool the reaction during the addition. The reaction mixture was hydrolyzed by addition to ice water. The ether layer was separated and dried over calcium sulfate. The dried ether mixture was filtered and the ether removed by vacuum distillation to obtain the crude $(CF_3CH_2CH_2)_4Sn$. Recrystallization from hexane gave a white crystalline solid, having a melting point of 71.5–72.5° C.

The mass spectrum and $F^{19}$ NMR spectral data confirmed the structure of the tetrakis(3,3,3-trifluoropropyl) tin.

EXAMPLE 2

A etheral solution of 25.9 grams of dimethyl tin dichloride was added to a solution of 3,3,3-trifluoropropyl-magnesium bromide. The reaction mixture was hydrolyzed and the organic layer was separated. The ether solution was dried over calcium sulfate and the solvent was removed by vacuum distillation. Distillation of the liquid residue gave 22.2 grams of bis (3,3,3-trifluoropropyl)dimethyltin having a boiling point of 181–181.5° C. glc. analysis indicated greater than 99% purity. The structure of $(CF_3CH_2CH_2)_2Sn(CH_3)_2$ was confirmed by spectral data.

EXAMPLE 3

Bis(3,3,3-trifluoropropyl)-di-n-butyltin was prepared by the reaction of dibutyltin dichloride with 3,3,3-trifluoropropylmagnesium bromide. The product had a boiling point of 131–132° C./10 mm. Hg and was obtained with a purity of greater than 98%, as indicated by glc. The $(CF_3CH_2CH_2)_2Sn(n-C_4H_9)_2$ structure was confirmed by the mass spectrum, $H^1$ NMR and $F^{19}$ NMR.

EXAMPLE 4

Bis(3,3,3-trifluoropropyl)diphenyltin was obtained by reacting diphenyltin dichloride with 3,3,3-trifluoropropyl-magnesium bromide. The product had a melting point of 55.5–56.7° C. The $(CF_3CH_2CH_2)_2Sn(C_6H_5)_2$ structure was confirmed by spectral data.

EXAMPLE 5

A mixture of 29.1 grams of tetrakis (3,3,3-trifluoropropyl) tin and 13.0 grams of tetrachlorotin was refluxed for seven hours. The temperature of the reaction equilibrated at 212° C. after three hours. Distillation of the disproportioned mixture gave 11 grams of 3,3,3-trifluoropropyl tin trichloride (boiling point, 93.2–95° C./24 mm. Hg) and 8 grams of tris (3,3,3-trifluoropropyl) tin chloride (boiling point, 144–155° C./24 mm. Hg).

EXAMPLE 6

A solution of 35 grams of $(CF_3CH_2CH_2)_3SnCl$ in 50 milliliters of ether was added to an etheral solution containing 1.5 grams of $LiAlH_4$ over a period of 10 minutes. The ether solution refluxed slightly. After stirring for one hour at room temperature, the ether and product were distilled through a Claisen head to remove excess $LiAlCH_4$ and salts. Redistillation gave $(CF_3CH_2CH_2)_3SnH$ which had a boiling point of 64° C./1 mm. Hg. Infrared, $H^1$ and $F^{19}$ NMR spectral data were consistent with the tris(3,3,3-trifluoropropyl) tin hydride structure.

Reduction of $(CF_3CH_2CH_2)_2SnCl_2$ by means of the above described reaction with lithium aluminum hydride gave bis(3,3,3-trifluoropropyl) tin dihydride which had a boiling point of 23° C./1.1 mm. Hg.

EXAMPLE 7

A phenyl magnesium bromide solution was prepared from 40 grams of bromobenzene and 6 grams of magnesium turnings in 500 milliliters of ether, 3,3,3-trifluoropropyl tin trichloride (19.4 grams) was added over a period of 15 minutes. The reaction mixture was stirred at reflux for one hour and then hydrolyzed. The organic layer was separated, washed and dried over calcium sulfate. The ether was removed by vacuum distillation to obtain a yellow solid. Recrystallization of this material from ethanol gave a white crystalline solid (3,3,3-trifluoropropyl) triphenyltin, which had a melting point of 104–107° C. The infrared, $H^1$ NMR and $F^{19}$ NMR spectra were in agreement with the structure of

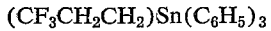
$(CF_3CH_2CH_2)Sn(C_6H_5)_3$

EXAMPLE 8

A solution of tris(3,3,3-trifluoropropyl) tin chloride in methanol was added dropwise to a solution of sodium methoxide. The reaction was carried out at 0° C. The salts were removed by filtration and the methanol was removed by vacuum distillation. The residual material was distilled to give tris(3,3,3-trifluoropropy)Sn(OCH_3) having a boiling point of 82° C./0.6 mm. Hg.

That which is claimed is:

1. A fluoroalkyltin compound of the formula

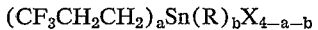
$(CF_3CH_2CH_2)_aSn(R)_bX_{4-a-b}$ in which

R is selected from the group consisting of lower alkyl radicals, alkoxy radicals, acyloxy radicals, the hydrogen atom, the vinyl radical and phenyl radical;

X is selected from the group consisting of chlorine, bromine, iodine and fluorine atoms;

$a$ is an integer having a value of from 1 to 4 inclusive; and $b$ is an integer having a value of from 0 to 3 inclusive; the sum of $a+b$ being no greater than 4.

2. In accordance with claim 1, tetrakis(3,3,3-trifluoropropyl) tin.

3. In accordance with claim 1, tris(3,3,3-trifluoropropyl) tin chloride.

4. In accordance with claim 1, bis(3,3,3-trifluoropropyl) tin dichloride.

5. In accordance with claim 1, 3,3,3(trifluoropropyl) tin trichloride.

References Cited

UNITED STATES PATENTS

| | | | |
|---|---|---|---|
| 3,423,443 | 1/1969 | Blochl | 260—429.7 |
| 3,470,221 | 9/1969 | Chadla et al. | 260—429.7 |

FOREIGN PATENTS

| | | | |
|---|---|---|---|
| 926,282 | 5/1963 | Great Britain | 260—429.7 |
| 933,365 | 8/1963 | Great Britain | 260—429.7 |

OTHER REFERENCES

Cullen et al., J. Organometallic Chem., vol. 6 (1966), p. 117, 260—429.7.

JAMES E. POER, Primary Examiner

W. F. W. BELLAMY, Assistant Examiner

U.S. Cl. X.R.

260—45.75; 424—288